Patented Oct. 27, 1953

2,657,226

UNITED STATES PATENT OFFICE 2,657,226

NOVEL CYANOALKOXY SILANES

Kurt C. Frisch, Pittsfield, Mass., and Milton Wolf, Syracuse, N. Y., assignors to General Electric Company, a corporation of New York No Drawing. Application November 22, 1952, Serial No. 322,149

6 Claims. (Cl. 260—448.8)

This invention is concerned with novel compositions of matter and more particularly relates to cyanoalkoxy silanes corresponding to the general formula

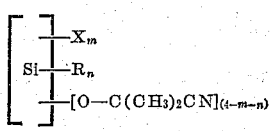

where R is a monovalent organic radical, X is a halogen, $m$ and $n$ are whole numbers equal to from 0 to 3, the sum of $m+n$ being equal to at most 3.

Among the radicals which R in the above formula may be are, for instance, hydrocarbon radicals, for example, saturated or unsaturated aliphatic radicals, for instance, vinyl, allyl, methallyl, propenyl, isopropenyl, butenyl, etc. radicals; methyl, ethyl, propyl, isopropyl, butyl, amyl, octyl, octadecyl, etc., radicals; aryl radicals (e. g., phenyl, naphthyl, anthracyl, etc.), alkaryl radicals, (e. g., tolyl, xylyl, ethylphenyl, etc.); aralkyl radicals, (e. g., benzyl, phenylethyl, etc.) cycloaliphatic radicals, (e. g., cyclopentyl, cyclohexyl, cyclohexenyl, etc.). If desired, all the foregoing hydrocarbon radicals may be substituted with substituents which are inert to any of the ingredients or in the conditions employed in the preparation of the cyanoalkoxy silanes.

The compositions herein described may be prepared in various ways. One method comprises effecting reaction between acetone cyanohydrin [(CH$_3$)$_2$C(OH)CN] with an organohalogenosilane of the formula $$R_aSiX_{(4-a)}$$

where R and X have the meanings given above, and $a$ is equal from 1 to 3. The particular cyanoalkoxy silane obtained will depend, of course, on the type of organohalogenosilane employed, the molar ratio of acetone cyanohydrin and the organohalogenosilane, etc. Generally, at least 1 mol of the acetone cyanohydrin should be employed for each mol of silicon-bonded halogen in the organohalogenosilane. When less than 1 mol is employed for each mol of silicon-bonded halogen, there will be obtained cyanoalkoxy silanes which may also have silicon-bonded halogen atoms. For the most part it is desirable to employ the acetone cyanohydrin in a ratio of, for instance, from about 0.5 to 2 to 3 or more mols of acetone cyanohydrin per mol of hydrolyzable silicon bonded halogen. The reaction is preferably conducted in a mutual solvent for the ingredients (e. g., benzene, toluene, xylene, etc.) and advantageously while the organohalogenosilane is added to the acetone cyanohydrin slowly at temperatures of the order of from about 0–5° C. For optimum results, the reaction is conducted in the presence of a hydrohalide acceptor, for instance, pyridine, morpholine, primary and secondary amines, etc. After permitting the reaction mixture to stand for a sufficient time to insure complete interaction between the ingredients, the desired cyanoalkoxysilane is removed from the unreacted ingredients and solvent, for instance, by fractional distillation.

The compositions herein defined can be employed as intermediates in the preparation of other synthetic compositions. For instance, they readily undergo reduction and oxidation reactions leading to the preparation of corresponding amines, amides, acids, esters and similar compounds. In addition, the cyanoalkoxy silanes containing hydrolyzable silicon-bonded halogen can be intercondensed with other organohalogenosilanes in the preparation of various silicone oils, rubbers, resins, etc. The cyanoalkoxy silanes free of silicon-bonded halogen described in the present application are useful in rendering materials water-repellent by applying the cyanoalkoxy silanes to the desired material and effecting cleavage of the cyanoalkoxy radicals. Such uses as that described immediately above for water repellant purposes are particularly advantageous, especially since there is no silicon-bonded halogen present in the cyanoalkoxy silane which obviates the necessity for neutralizing any formed hydrogen halide.

In order that those skilled in the art may better understand how the present invention may be practiced, the following examples are given by way of illustration and not by way of limitation. All parts are by weight.

Example 1

A solution of 54.3 grams (0.5 mol) of trimethyl-chlorosilane in 50 cc. of dry benzene was added slowly over a period of about one hour with stirring to a solution of 42.6 grams (0.5 mol) acetone cyanohydrin and 39.6 grams (0.5 mol) anhydrous pyridine in 100 cc. dry benzene. The reaction mixture was cooled during the addition of the trimethylchlorosilane to a temperature of about 0° to 5° C. Thereafter, the reaction mixture was permitted to stand at room temperature for about 16 hours and the solid pyridine hydrochloride formed was filtered and washed with benzene. The benzene washings were combined with the benzene solution of the filtrate and the mixture fractionally distilled to give a colorless liquid which boiled at about 145.5–147° C. This material which was 2-cyano-2-trimethylsiloxypropane having the formula $(CH_3)_3Si—O—C(CH_3)_2CN$ had the following properties: $n_D^{20}=1.4022$;

$d_4^{20}=0.857$ $M_R$(calculated) $=44.81$; $M_R$(found) $=44.7$. Analysis of the compound showed it to contain 18.0% silicon and 8.9% nitrogen (theoretical 17.9% silicon and 8.9% nitrogen).

*Example 2*

A solution of 49.2 grams (0.33 mol) dimethyldichlorosilane and 50 cc. of dry toluene was added gradually over a period of about 45 minutes with stirring to a solution of 64.7 grams (0.76 mol) of acetone cyanohydrin and 60.1 grams of anhydrous pyridine in 75 cc. of dry toluene. During this addition, the temperature of the reaction mixture was kept at 0° to 5° C. Thereafter, the mixture was allowed to stand at room temperature for about two hours and the precipitated pyridine hydrochloride was filtered, washed with toluene, the toluene washings combined with the filtrate and the entire mixture fractionally distilled to give a colorless liquid which boiled at about 124–126° C. at 21 mm. This material had the following properties:

$n_D^{20}=1.4174$ $d_4^{20}=0.9644$ $M_R$(calculated) $=59.34$ $M_R$(found) $=59.06$.

Analysis of this material showed it to contain 12.6% silicon and 12.5% nitrogen (theoretical 12.4% silicon and 12.4% nitrogen). The compound thus obtained was bis-(2-cyanopropoxy)dimethylsilane having the formula $NC(CH_3)_2C—O—Si(CH_3)_2—O—C(CH_3)_2CN$

*Example 3*

A solution of 85 grams (1 mol) of acetone cyanohydrin and 79 grams (1 mol) of dry pyridine in 200 cc. benzene was added slowly over a period of about 1 hour to a solution of 448.5 grams (3 mols) of methyltrichlorosilane in 300 cc. benzene. Throughout the addition, the mixture was well stirred and kept at 0 to 5° C. The mixture was allowed to stand at room temperature (about 25° C.) for about an additional 2½ hours. The white precipitate of pyridine hydrochloride was filtered and washed with benzene. The benzene washings were combined with the filtrate and the mixture fractionally distilled under vacuum to obtain a colorless liquid boiling at about 70–71° C. at 15 mm. This material which comprised the compound 2-cyanopropoxymethyl dichlorosilane having the formula $NC(CH_3)_2C—O—Si(CH_3)Cl_2$ was found to have the following properties: $n_D^{23}=1.4210$; $d_4^{23}=1.137$; $M_R$(calculated)$=44.07$; $M_R$(found) $=44.22$. Analysis of the composition showed it to contain 14.1% silicon and 7.4% nitrogen (theoretical 14.1% silicon and 7.1 nitrogen).

*Example 4*

Bis-(2-cyanopropoxy)methylchlorosilane was prepared as follows. To a solution of 300 grams (2 mols) methyltrichlorosilane in 200 cc. benzene was added gradually with stirring and cooling at about 0 to 5° C. a mixture of 121 grams (1.4 mols) of acetone cyanohydrin and 111 grams (1.4 mols) dry pyridine. After addition of the ingredients, the reaction mixture was allowed to stir at room temperature for about 16 hours. The pyridine hydrochloride was removed by filtration and the precipitate washed several times with benzene. The benzene washings were then combined with the filtrate and the mixture fractionally distilled under vacuum to give a colorless liquid boiling at about 96–97° C. at about 0.2 mm. Analysis of this composition showed it to contain 11.6% silicon and 11.8% nitrogen (theoretical 11.4% silicon and 11.4% nitrogen). The compound bis-(2-cyanopropoxy) methylchlorosilane has the formula $[NC(CH_3)_2C—O]_2—Si(CH_3)Cl$

*Example 5*

The compound tris-(2-cyanopropoxy)methylsilane having the formula $[NC(CH_3)_2C—O]_3SiCH_3$ may be prepared by effecting reaction between methyltrichlorosilane and acetone cyanohydrin in a molar ratio of at least 3 and preferably more than 4 mols of the acetone cyanohydrin per mol of methyltrichlorosilane, in the presence of a hydrohalide acceptor employing the same conditions described in the foregoing examples. In order to obtain optimum yields of tris-(2-cyanopropoxy) methylsilane, it is desirable to employ the acetone cyanohydrin in a large excess in order to cause the equilibrium to shift to a point where all three silicon-bonded chlorines in the methyltrichlorosilane are caused to react with the acetone cyanohydrin.

*Example 6*

Using the procedure described in the foregoing examples, 2-cyano-2-triphenylsiloxypropane having the formula $(C_6H_5)_3Si—OC(CH_3)_2CN$ may be prepared by effecting reaction between 1 mol of triphenylchlorosilane in a common solvent such as benzene with acetone cyanohydrin (1 mol), employing anhydrous pyridine as the catalyst, and thereafter isolating the desired product.

*Example 7*

This example illustrates the preparation of certain of the derivatives of the cyanopropoxysilanes and in particular described the preparation of acetoxy derivatives prepared from 2-(cyanopropoxymethyldichlorosilane and bis-(2-cyanopropoxy) methylacetoxysilane. More particularly, 2-cyanopropoxymethyldichlorosilane and bis-(2-cyanopropoxy)methylchlorosilane described in Examples 3 and 4 were each reacted with an equal amount of acetic anhydride for about 2 hours using a few drops of an triethanol amine solution in acetic anhydride to catalyze the reaction. The reaction product thus obtained in each case was fractionally distilled to give colorless liquids which were identified as 2-(cyanopropoxy) methyldiacetoxysilane (boiling at about 130–132° C. at 14 mm. and analysis of which showed it to contain 11.6% silicon as compared to the theoretical value of 11.4% silicon) and bis-(2-cyanopropoxy)methylacetoxysilane (boiling at about 100° C. at 0.07 mm. and which analysis showed it to contain 11.0% silicon as compared to the theoretical value of 10.4% silicon).

It will, of course, be apparent to those skilled in the art that instead of using the organohalogenosilanes employed above, other organohalogenosilanes, many examples of which have been given previously, may be used in their place without departing from the scope of the invention. Additional examples of compounds which may thus be prepared are, for instance, bis-(2-cyanopropoxy) diphenylsilane, bis - (2 - cyanopropoxy) diethylsilane, 2 - cyano-2-tributylsiloxypropane, tris-(2-cyanopropoxy)benzylsilane, 2-cyanopropoxyethyldibromosilane, etc.

What we claim as new and desire to secure by Letters Patent of the United States is:

1. A composition of matter comprising a compound corresponding to the general formula

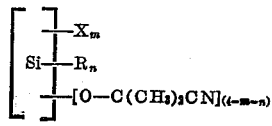

where R is a monovalent hydrocarbon radical, X is a halogen, $m$ and $n$ are each whole numbers equal to from 0 to 3, the sum of $m$ and $n$ being, at most, equal to 3.

2. The chemical compound 2-cyano-2-trimethylsiloxy propane.

3. The chemical compound bis-(2-cyanopropoxy) dimethylsilane.

4. The chemical compound 2-cyanopropoxymethyldichlorosilane.

5. The chemical compound tris-(2-cyanopropoxy) methylsilane.

6. The chemical compound bis-(2-cyanopropoxy) diphenylsilane.

KURT C. FRISCH.
MILTON WOLF.

No references cited.